United States Patent [19]

Balser et al.

[11] 4,336,828

[45] Jun. 29, 1982

[54] FIBRE-REINFORCED METALLIC LUSTER PIGMENTED TUBULAR CASING AND A PROCESS FOR ITS PRODUCTION

[75] Inventors: Klaus Balser; Walter Beger, both of Walsrode, Fed. Rep. of Germany

[73] Assignee: Wolff Walsrode AG, Leverkusen, Fed. Rep. of Germany

[21] Appl. No.: 167,056

[22] Filed: Jul. 9, 1980

Related U.S. Application Data

[60] Continuation of Ser. No. 954,442, Oct. 25, 1978, abandoned, which is a division of Ser. No. 720,258, Sep. 3, 1976, abandoned.

[51] Int. Cl.³ ............................................. A22C 13/00
[52] U.S. Cl. ................................. 138/118.1; 426/105; 427/230
[58] Field of Search ................ 426/105, 135; 427/230; 138/118.1

[56] References Cited

U.S. PATENT DOCUMENTS 2,875,077  2/1979  McLellan ............................ 426/105

*Primary Examiner*—Sam Silverberg
*Attorney, Agent, or Firm*—Connolly and Hutz

[57] ABSTRACT

Fibre-reinforced metallic pearlescent luster flake pigmented tubular casing with a seamless coating on its inside of a vinylidene halide copolymer lacquer, wherein the copper-, silver- or gold-colored pigment is embedded in a film forming impregnating agent in dispersed form; and a suitable process for the production of such fibre-reinforced pigmented casing.

8 Claims, No Drawings

FIBRE-REINFORCED METALLIC LUSTER PIGMENTED TUBULAR CASING AND A PROCESS FOR ITS PRODUCTION

This application is a continuation of application Ser. No. 954,442, filed on Oct. 25, 1978, abandoned which is a division of Ser. No. 720,258 filed Sept. 3, 1976 and now abandoned.

PRIOR ART

This invention relates to a fibre-reinforced metallic-lustre-pigmented tubular casing which shrinks in dependence upon the moisture level of the atmosphere.

Tubular casings with features such as these are already known and, in some cases, have been known for some considerable time from numerous printed publications and from samples available on the market.

Thus, DT-PS No. 545,566 for example describes a process for metallising cellulose hydrate films, in which a layer of metal is continuously applied to a cellulose hydrate film and a metallised sheet-form material produced in this way. Unfortunately, this process is unsuitable for the production of a tubular casing of the kind defined above because the layer of metal does not adhere firmly enough when fibre-reinforced substrates are used instead of cellulose hydrate. In addition, the flexibility, resilience and resistance to folding of sheet-form materials of this kind provided with metal layers are also unsatisfactory, quite apart form the considerable outlay involved in this manufacturing process.

By contrast, DT-PS No. 568,820 discloses a fibre-reinforced, shrinking and, optionally, pigmented tubular casing, the pigments being applied by standard dyeing processes either to the fibrous substrate or to the impregnating agent after it has hardened. With reference to DT-AS No. 1,302,384 which is acknowledged further below, a tubular casing obtained by this process is always finished with a dull surface resembling that of natural intestine. However desirable this dull surface may be in the context of DT-AS No. 1,302,384, it does prevent the development of the pearlescent effect required in cases where metallic lustre pigments are used. This is also confirmed in the secondary publication by W. Bäumer which is discussed further below.

DT-PS No. 1,142,297 also relates to fibre-reinforced tubular casings (column 3, line 35) in which the cellulose fibres are impregnated with regenerated cellulose. According to column 3, line 43, the tubular substrate can also be coloured. According to this Patent Specification, however, it is stipulated that an outer layer of vinylidene resin has to be applied to a fibre-reinforced tubular structure of the type in question with the result that, in contrast to the embodiment referred to earlier on, this tubular casing is unable to shrink in dependence upon the moisture level of the atmosphere because, as any expert knows, an outer layer of vinylidene resin reduces permeability to water vapour to a very considerable extent so that the moisture in the atmosphere can no longer reach the actual fibre-reinforced tubular casing, with the result that the material is unable to shrink in response to the moisture in the atmosphere.

The technical teaching disclosed in DT-AS No. 1,221,116 substantially corresponds to the teaching disclosed in DT-PS No. 1,142,297 dealt with earlier on because, in this case, too, the tubular casing of cellulosic substances is unable to shrink in dependence upon the moisture level of the atmosphere on account of an outer layer of vinylidene resin. Apart from this, the tubular structure is not reinforced, i.e. fibre-reinforced.

Although DT-AS No. 1,302,384 describes in detail a fibre-reinforced tubular casing shrinking in dependence upon the moisture level of the atmosphere, it specifically points out to the expert in column 2, line 28 that tubular casings of the kind in question have a matt (respective dull) appearance similar to that of natural intestine. Accordingly, matt (respective dull) casings of this kind are unlikely to be able to be given a metallic appearance by appropriate pigmenting, unless vinylidene resin is applied to the outside rather than the inside of the tubular casing, in accordance with the teaching in column 1, lines 19 to 27, because in this case a surface of high lustre is obtained. As already mentioned above, however, the presence of the vinylidene resin on the outside of the tubular casing means that the casing is unable to shrink in dependence upon the moisture level of the atmosphere because the resin prevents the access of moisture to the tubular casing.

In addition to the difficulties referred to above, the expert was also confronted by such problems as those discussed for example in US-PS No. 3,508,935 which are concerned inter alia with the sensitivity of metallic pigments to alkaline reacting compounds. This is of importance insofar as the impregnation of fibre-reinforced tubular casing is often carried out with strongly alkaline reacting solutions of cellulose xanthogenate which experts refer to in short as "viscose". However, as can be seen from Comparison Example 24 of the above-mentioned US-PS, column 18, lines 29 to 42, the metallic lustre pigments are undesirably dissolved before they are able to impart a corresponding metallic lustre to the end product. Elsewhere in this US-PS (cf. Example 25, column 18, lines 46 et seq) it is stated that this undesirable dissolution of the metallic lustre pigment can only be avoided by reducing the pH-value, which can only be accomplished (as apparent from the above-mentioned US-PS as well) by producing a special viscose by a correspondingly elaborate viscose manufacturing process.

In order to overcome these difficulties, which had been well known among experts for some considerable time, an akkali-resistant metallic lustre pigment was developed towards the end of 1969 and its properties in DT-OS No. 1,959,998, so that it was no longer necessary to use an almost neutrally reacting special viscose. Although the use of these pearlescent pigments based on titanium dioxide and mica, as discussed in particular on page 11 of this DT-OS, is preferably directed to plastics sheeting (where in fact sheet-form materials are discussed), thes pigments can be dispersed and further processed equally well in other standard substrates without undergoing any adverse changes in cases where, as mentioned above, the substrates are produced by hardening alkaline reacting solutions.

Two years after the publication of DT-OS No. 1,959,998 discussed above, comprehensive documentation and handling instructions for these pearlescent pigments was given to the expert by W. Bäumer's article entitled "Perlglanz und Perlglanzpigmente" in the Journal Farbe und Lack, Vol. 79, No. 6/1973, pages 530–537, No. 7/1973, pages 638–645 and No. 8/1973, pages 747–755. In addition to numerous important items of information, it is also pointed out to the expert in the Table on page 750 that, in the form of their titanium dioxide-mica variants, pearlescent pigments may readily be introduced into cellulose hydrate in the form of its liquid precursor, namely viscose, and used for pearlescent pigmenting.

However, in view of the scope of the invention as mentioned at the beginning, the advantageous use of the new pearlescent pigments thus described is seriously restricted insofar as the fibre-reinforced sheet-form materials which alone are mentioned cannot be pigmented advantageously with the pearlescent pigments in question because it is apparent from page 751, left-hand column, parapraph 5 of the last of the above-mentioned publications that fibre-reinforced materials cannot readily be pigmented with pearlescent pigments because their reinforcement prevents the flakes from being correctly oriented throughout the material. By way of assistance, the expert is then recommended additionally to apply a gel coat to the substance, i.e. additionally to apply a gel-like sealing coating to the sheet-form material so that the required effect, namely pearlescent pigmenting, may be obtained. However, apart from the additional and hence expensive process step which they involve, gel coats generally have a very adverse effect upon the ability of a tubular casing to shrink in dependence upon the moisture level of the atmosphere which is a primary requirement of the present invention.

In conjunction with the prior art discussed thus far, this latest comprehension publication left only two possibilities open to the expert, i.e. either to apply the complicated gel coat process or to forget about pearlescent pigmenting sofar as fibre-reinforced tubular casings are concerned.

OBJECT OF THE INVENTION

It is therefore an object of the invention to provide a suitable fibre-reinforced metallic-lustre-pigmented tubular casing, which shrinks in dependence upon the moisture-level of the atmosphere and which, despite the absence of a gel coat, has a pearlescent metallic lustre appearence.

THE INVENTION

Accordingly this invention relates to a tubular casing with a pearlescent appearance, which comprises a fibre-reinforced metallic lustre pigmented tubular fabric, impregnated with an impregnating agent selected from the group consisting of film forming polymers, said agent containing an alkali-resistent metallic lustre pigment in an amount of 5 to 60 percent by weight based on the weight of the agent.

Appropriately the impregnating agent is an alkaline solution of the film forming polymer in the form of cellulose-xanthogenate.

It is of particular advantage, if said pigment is a metallic pearlescent flake pigment, which is present in the impregnating agent in an amount of 15 to 40 percent by weight, based on the weight of the agent.

Although the invention may be embodied with particular advantage in the form of fibre-reinforced tubular casings pigmented in at least one layer with copper coloured pearlescent pigments, silver coloured pearlescent pigments or gold coloured pearlescent pigments, it is also possible in accordance with the invention to use any other pearlescent pigments providing they are stable in a liquid, aqueous, alkaline reacting impregnating agent such as, for example, viscose and when the impregnating agent is hardened are arranged in such a way, despite the fibrous substrate, that a metallic pearlescent tubular casing is formed.

In addition, the titanium dioxide-mica pigments described in the last of the above mentioned publications in Farbe und Lack, Vol. 79, No. 7, 1973 on page 642, may be used with particular advantage in accordance with the invention.

For numerous applications, it is entirely sufficient for the impregnating agent containing the metallic pearlescent pigment to be applied to and solidified on only one of the two sides of the tubular casing according to the invention. In cases where the tubular casing is impregnated on one side only with the impregnating agent containing the metallic pearlescent pigment, the other side may be impregnated with a substance which does not contain the metallic pearlescent pigment.

It is equally possible in accordance with the invention for the hardened impregnating agent to contain other dyes in addition to the metallic pearlescent pigment. An impregnating agent such as this containing pigment and additional dyes may either have been used for impregnating the entire nonwoven fabric or only half the fabric may have been impregnated with this impregnating agent containing the various colouring substances, whilst the other half is provided with an impregnating agent free from colouring substances. However, it is equally possible for the tubular casing according to the invention to contain the impregnating agent containing the metallic pearlescent pigment in hardened form in and on one of its two sides and to contain an impregnating agent merely containing the additional dye in hardened form on the other of the two sides.

In general, the above mentioned pigments, naturally like any other colouring substances, may be used as additives in accordance with the invention providing they are compatible with the liquid, aqueous alkaline reacting impregnating agent. Colouring substances of this kind are known per se and according to the invention may be used with particular advantage in the form of their dark shades in order to increase contrast with the metallic pearlescent flake pigment. However, if accordingly dark primary colour finishes also produce an increase in contrast in relation to the metallic pearlescent pigments, it is equally possible, instead of producing the dark primary colour finishes in the fibre-reinforced tubular casing, to produce lighter shades in the form of red, green, blue, yellow and other colours in combination with the metallic pearlescent flake pigments. For example, a special platinum-like metallic lustre can be obtained in tubular casings where, in addition to silver pearlescent pigments, they contain a grey non-opapue dye to which small quantities of a yellow, similarly non-opapue dye have been added.

Proceeding on the basis of the fact that fibre reinforced tubular casings which shrink in dependence upon the moisture level of the atmosphere generally shrink not only in dependence upon the moisture in the atmosphere, but also possibly in dependence upon the internal moisture given off from a material accommodated in the tubular casing, the fibre-reinforced tubular casing according to the invention which only shrinks in dependence upon the moisture in the atmosphere has preferable to be built up in such a way that the internal moisture is unable to reach that part of the tubular casing which shrinks in dependence upon moisture. According to the present invention, this result is obtained with advantage by virtue of the fact that on its inside the tubular casing has a seamless coating of a vinylidene halide copolymer lacquer known per se which prevents permeability to water vapour and, hence, moisture-induced shrinkage and in addition the permeation of gases. Other coatings with corresponding properties are of course also suitable and may be used by the expert. In this connection, it is left to the expert, in the event of inadequate adhesion between the inner coating reducing permeability to water vapour and the inside of the tubular casing according to the invention, to provide a known adhesion promoter between the tubular casing and the inner coating.

In certain cases the metallic pearlescent lustre flake pigments may be present in the tubular casing in large quantities without, as might have been expected, any partial or complete loss of or adverse effect upon flexibility folding strength and other favourable properties. By virtue of the fact that it retains these favourable properties, the tubular casing according to the invention may equally well be present in shirred form without any reduction in its utility value. This is particularly important in cases where the tubular casings are intended to be subsequently used as food casings where the shirred form of the casing us often preferred. Shirring itself may be carried out by methods known per se.

In other certain cases, it may be useful, that the said metallic pearlescent lustre flake pigmented tubular casing may also have other individually known modifications, for example it may be provided at least partially with a colouring medium, for example in the form of a printing ink.

Contrary to the unfavourable results which had been expected form the prior art, the invention thus provides a fibre-reinforced metallic-pearlescent-lustre-flake-pigmented tubular casing which shrinks in dependence upon the moisture level of the atmosphere, manages without the additional coating in the form of a gel coat and, in spite of the reinforced hitherto regarded by experts as unfavourable for the incorporation of pearlescent pigments, shows an arrangement of the metallic pearlescent flake pigments in the impregnating substance which provides the finished tubular casing with an outstanding metallic pearlescent finish. This surprising brilliance of the tubular casing according to the invention pigmented with a metallic pearlescent flake pigment is not only shown by the samples submitted with the Application, it can also be demonstrated in concrete terms on the basis of the measurements described further below.

Since in addition it is quite clear from the most recent publication of the prior art as mentioned above (Bäumer), pages 751 et seq, that it is very difficult, if not impossible, to measure the pearlescence of sheet-form materials pigmented with metallic flake pigments, Applicants have developed a simple measurement by means of standard apparatus known among experts which allows a comparative examination of the surface gloss of corresponding sheet-form materials and which is described in detail further below.

The invention may be embodied in a variety of different forms. However, if for known reasons there is no need for the expert to show any preference for a certain process, it is intended in accordance with the invention to provide him with a selective process for the case where, as described above, the impregnating agent is an alkaline solution of cellulose xanthogenate. A said process for the production of a fibre reinforced metallic lustre pigmented tubular casing, at first a metallic pearlescent flake pigment is predispersed in an alkaline reacting dispersant, whereafter the resulting dispersion is added to and well homogenized in an alkaline solution of cellulose-xanthogenate. The resulting pigmented impregnating agent is then contacted with a structured substance such as, for example, long fibred paper or the like, which is formed to a tube in a per se known manner, and the resulting impregnated fibre reinforced metallic lustre pigmented tubular casing is finally coated with a seamless coating of a vinylidene-halide copolymer lacquer, this coating step is performed either inside of the tube or outside of the tube and then turning it inside out. The particular metallic pearlescent flake pigment required and, optionally, additional dyes are best added to a cellulose xanthogenate solution of this kind in the concentration and quantity selected only after ripening of the cellulose xanthogenate is over and the material is intended to be formed into a fibre-reinforced tubular casing. The expression "ripening" is well known among experts and is explained in detail for example in K. Gotze's work entitled "Chemiefasern nach dem Viskoseverfahren", Berlin 1967, pages 468 et seq.

Also, it has been found that addition of the metallic pearlescent flake pigment to the alkaline solution of the cellulose xanthogenate when the ripening process is over has the surprising effect that the metallic pearlescent flake pigment particles which, basically, are very susceptible to shear stressing (cf. Farbe und Lack, Vol. 79, No. 8, 1973, page 748) do not disintegrate, but remain substantially undamaged contrary to the predictions of experts, as shown by the pearlescence measurements reported hereinafter on the complete fibre-reinforced tubular casing according to the invention.

In addition, it is of particular advantage for the purposes of the process according to the invention for the metallic pearlescent flake pigments to be predispersed in an alkaline reacting dispersant which is compatible with the viscose. The simplest way of obtaining this result is to use ripened viscose as the dispersant, although it is also possible to use other dispersants such as, for example, a dilute solution of an alkali hydroxide.

At all events, it is possible by virtue of the surprising strength of the metallic pearlescent pigments used to employ a variety of different, standard dispersion apparatus for introducing the pigments into the dispersant.

The fibre-reinforced tubular casing according to the invention pigmented with metallic pearlescent pigments may be used both quite generally for packaging dry or moist, solid or even pasty or liquid goods and also specifically for the production of food-filled casing sections sealed at both ends. In this particular case, the tubular casing according to the invention is particularly suitable for the production of sausage-filled sausage casings at both ends. To this end, it is possible to use both un-shirred and also shirred tubular casings according to the invention. Instead of being filled with sausage, the casings may of course also be filled with cheese. Other fields of application in the food sector are, for example, remoulades which can be packed in tubular casings, mustard, tomato ketchup, mixtures of spices, soup powders, sauce powders and other foods. However, plant seeds and other compounds may also be packed in the tubular casings according to the invention. Cosmetic articles, for example face creams, shampoos, toothpastes and other articles, may also be packed in the tubular casings according to the invention.

The fibre-reinforced tubular casings according to the invention pigmented with metallic pearlescent flake pigments are generally suitable for packaging light-sensitive goods by virtue of their light-shielding function.

Even in cases where these goods are sensitive to water vapour and oxygen in addition to light, they may safely be stored in the tubular casings according to the invention because, as already mentioned, the tubular casings according to the invention may also be produced and used for this purpose by the provision of a corresponding internal coating which reduces permeability to water vapour and gases. If desired, the tubular casings according to the invention may also be provided with a tear-open device known per se.

Further applications, for example in combination with other known devices, are also possible within the scope of the invention.

The tubular casings according to the invention, their production and their use are described in the following Examples, although the subject of the invention is by no means limited to these Examples.

Since in these Examples the comparative measurement of pearlescence is an important method of determining an important parameter of the invention, particular significance was attributed to the determination of pearlescence. W. Bäumer's article referred to in the preamble "Perlglanz und Perlglanzpigmente", Farbe und Lack, Vol. 79,1973, shows inter alia that measurement of the mirror shine in accordance with ASTM C 346 at an angle of 45° does not provide useful values for the comparative measurement of pearlescence. Accordingly, spectral remission on the principle of diffuse reflection using Ulbricht's ball known per se was used for the measurement employed and quoted in the following Examples. The apparatus used was a Zeiss spectral photometer PMQ II with a glass prism double monochromator corresponding to Zeiss specification No. G 50-657/VI-d, Oberkochen 1968 with ball attachment KA (Ulbricht's ball) corresponding to Zeiss specification G 50-657/ka/Erg-d, Oberkochen 1963. The measuring opening of the ball was adjusted in such a way that a test surface of an average 30 mm can be covered in each case. The emitted light used for measurement had a wavelength of 740 nm ($=m\mu$). At this wavelength, as opposed to shorter wavelengths, remission values comparable in regard to the correct intensity difference are produced not only by silver and gold pearlescent pigments, but also by copper pearlescent pigments. In addition, the wavelength referred to above, which lies at the limit of the visible proportion of the light, largely eliminates the influence of the particular colours of the pearlescent pigment used and in addition the colours of the additional dyes, so that the remitted light concerns the pearlescence alone and hence may be regarded and used as a relative measure of pearlescence.

There now follows first of all some Examples illustrating the product according to the invention.

EXAMPLE 1

A fibre-reinforced tubular casing is made up in the form of a multilayer artificial intestine in accordance with DT-AS No. 1,302,384, its regenerated cellulose impregnation containing a silver pearlescence flake pigment produced in accordance with DT-OS No. 1,959,998. Other standard pigments in the form of a white pigment and a black pigment are added to this pearlescent flake pigment. Accordingly, the tubular casing according to the invention has a total pigment content of 31%, based on absolutely dry substance of the film-forming polymer. Of these 31% by weight of total pigment, based on 100 parts by weight of the total pigment, 93.9 parts by weight are titanium dioxide-mica silver pearlescent flake pigment according to DT-OS No. 1,959,998; 4,7 parts by weight are standard titanium dioxide white pigment and 1.4 parts by weight standard black pigment.

Measurement of the silver pearlescence by the method described above produced a remission of 27.2%.

EXAMPLE 2

The tubular casing had basically the same structure as in Example 1, except that both the black pigment and the white pigment were left out and their respective quantities by weight replaced by the silver pearlescent pigment described in Example 1. Accordingly, the total pigment content again amounted to 31% by weight, but was made up exclusively by the silver pearlescent pigment.

Pearlescence measurement produced a remission value of 31.7% of the product.

EXAMPLE 3

In this Example, the tubular casing according to the invention has exactly the same structure as the casing according to Example 2, except that, instead of 31% by weight of silver pearlescent pigment, it contains 31% by weight of copper pearlescent pigment, based on the dry substance of the film-forming polymer.

Pearlescence measurement produced a remission value of 33.5%.

EXAMPLE 4

In this case, too, the basic structure of the tubular casing according to the invention pigmented with a metal pearlescent flake pigment corresponds to a multilayer artificial intestine according to DT-AS No. 1,302,384, the only difference being that impregnation of the long-fibred paper is carried out with two different impregnating agents, of which the impregnating agent added from outside and now hardened contains all the pigments, whilst the impregnating agent added from inside and now hardened does not contain any pigment. Quantitatively, the external impregnating agent has a total pigment content of 33.5% by weight, based on the hardened film-forming polymer. Of these 100 parts by weight of total pigment, 98.4 parts by weight are made up by a titanium dioxide mica pearlescent gold pigment and 1.6 parts by weight by a standard red-brown pigment.

Remission measurement produced a value of 54.8%.

EXAMPLE 5

In this Example, the tubular casing according to the invention pigmented with a pearlescent flake pigment is also produced with different externally and internally applied impregnating agents, the difference being that the hardened external impregnating agent contains 22% by weight of a titanium dioxide-mica gold pearlescent flake pigment according to DT-OS No. 1,959,998, whilst the hardened internal impregnating agent contains 11% by weight of a pigment dye mixture which, based on 100 parts by weight, consists of 95 parts by weight of a standard yellow pigment and of 5 parts by weight of a standard red-brown pigment.

This Example is intended to demonstrate that a considerable proportion of the gold pigment may be replaced by other pigments so that, when the pearlescent pigment is backed up by additional pigments, a relatively high degree of pearlescence is still obtained.

This is proved by the remission value determined as described above which, in this case, amounts to 41%. It was unexpected that, at the above-mentioned measuring wavelength of 740 nm at which only the pearlescence values and not the colour values are measured, it would still be possible to obtain such a high degree of pearlescence in reinforced tubular casings.

EXAMPLES 6 TO 15

In order to determine the favourable concentration of pearlescent flake pigment, the corresponding remission values were determined for reinforced tubular casings according to the invention provided with silver pearlescent flake pigments and copper pearlescent pigments, the concentration of pearlescent flake pigment ranging from 5.5% by weight to 55% by weight of pearlescent flake pigment, based on absolutely dry substance of the impregnating polymer.

| % by weight of pearlescent flake pigment, based on absolutely dry polymer | Example No. | Remission values for silver pearlescent flake pigment in % | Example No. | Remission values for copper pearlescent flake pigment in % |
|---|---|---|---|---|
| 5.5 | 6 | 25.7 | 11 | 26.0 |
| 11.0 | 7 | 26.9 | 12 | 28.4 |
| 22.0 | 8 | 30.8 | 13 | 34.0 |
| 33.0 | 9 | 31.7 | 14 | 34.9 |
| 55.0 | 10 | 32.7 | 15 | 38.4 |

The Examples summarised in the above Table show that there is very little change in the remission values beyond a content of the absolutely dry polymer of about 40% by weight of pearlescent flake pigment, which means that it is generally sufficient to add from 20 to 30% by weight of pearlescent pigment, based on the absolutely dry weight of the hardened polymer.

EXAMPLE 16 (Comparison Example)

In contrast to all preceding Examples, the tubular casing used for this Example does not contain a pearlescent flake pigment or an added dye, but in its structure it corresponds exactly to a multilayer artificial intestine of the type described in DT-AS No. 1,302,384. Measurement of this standard pigment-free artificial intestine produces a remission value of only 21.0%.

It follows from this that the products according to the invention give much better remission values than standard commercial-grade products even when, as in Examples 6 and 11 they contain only 5.5% by weight of pearlescent pigment based on the dry, hardened film-forming polymer. This is all the more unexpected insofar as the tubular casings involved are reinforced tubular casings which, according to the prior art literature, should never have shown such a distinct improvement in pearlescence.

In view of the special development of the process described in the foregoing, there now follows a corresponding Process Example, although the subject of the invention is by no means limited to this process.

EXAMPLE 17

8 kg of a standard commercial-grade viscose, produced and ripened in accordance with K. Gotze "Chemiefasern nach dem Viskoseverfahren", Vols. I and II, 3rd Edition, Berlin/Heidelberg/New York 1967, pages 282, 356, 395, 420, 468, 488, 518, 779 and 806, are diluted with 4 kg of water. 2 kg of the dry pearlescent flake pigment Iriodin ® Ti 100 (registered Trademark of E. Merck, Darmstadt, Western Germany) are then stirred at room temperature into the viscose thus diluted with water using a standard grade stirrer. After the mixture has been homogenized by stirring, it is added to a normal viscose in a ratio by weight of 1:4 in a suitable standard stirrer-equipped vessel and, after a stirring and homogenising time of 22 minutes, the mixture is delivered by means of suitable delivery pumps to an annular slot die, a long-fibred paper is impregnated in the usual way with the viscose thus formed, after which the viscose is hardened by acid precipitation. The finished tubular casing according to the invention contained 36% by weight of silver pearlescent flake pigment, based on the dry substance of the film-forming polymer. The tubular casing thus produced had a remission value of 32%.

In order to determine whether the products according to the invention, as described and produced in the preceding Examples, satisfy all requirements when used as sausage skins, the tubular casings were filled either with dry material or with sausage meat in accordance with the following Application Examples and cooking sausage, boiling sausage or other sausages produced therefrom. The appearance of the filled tubular casings thus treated was then visually assessed, because pearlescence could not be measured by the method described earlier on because this method can only be carried out with flat tubular casings and not with filled, i.e. round casings.

EXAMPLE 18

A tubular casing pigmented with silver pearlescent pigment, produced in accordance with Example 17, is tied at one end and stuffed full with a dry granular material in the form of sand. The other end of the tubular casing was then tied in the usual way and the product visually assessed. The filled tubular casing according to the invention showed a pearlescence which was considerably superior to that of unfilled tubular casings (corresponding samples are enclosed with the Application).

EXAMPLE 19

A tubular casing according to the invention (Example 13) pigmented with copper pearlescent pigment is first washed with water for 30 minutes at 30° C., subsequently stripped out to remove the water from the skin and then filled with liver sausage under a pressure of 0.3 to 0.4 atms gauge. After the tubular casing according to the invention thus filled has been sealed, it is boiled for 1 hour at 72° C. and, after boiling, is cooled over a period of 30 minutes to 18°–20° C. using tap water. The product is then hung up, dried and stored in a cold room at a temperature of +4° to +6° C. The dried and, hence, shrunk sausage showed an excellent degree of pearlescence.

EXAMPLE 20

The procedure was as in Example 19, except that the casing was filled with black pudding instead of liver sausage. Accordingly, the boiling temperature was increased from 72° to 82° C. for otherwise the same production conditions.

Visual assessment of the finished sausage showed that even this high temperature had been absorbed without damage by the tubular casing according to the invention, and that the finished sausage showed an excellent degree of pearlescence.

EXAMPLE 21

A tubular casing according to the invention was treated in the same way as in Example 20, except that it was provided with a gold pearlescent flake pigment and had the same structure as the tubular casing according to Example 4.

Despite its correspondingly severe treatment, this product also showed an excellent degree of pearlescence after drying.

Generally, it was found that, beyond the scope of the preceding Examples, a variety of different reinforced tubular casings according to the invention pigmented with pearlescent pigments can be used both for the production of coarse or delicatessen or calves liver sausage primarily in printed form (mostly with gold pearlescent pigment) and for the production of liver sausage and black pudding (frequently pigmented with silver pearlescent pigment), also for the production of liver sausage and boiling sausage (primarily pigmented with copper pearlescent pigment) and finally for the production of raw sausage such as, for example, salami and Cervelat sausage (but only when pearlescence is not reduced due to the relatively high permeability to water vapour of the casing as the resulting change in shrinkage behaviour).

There now follows some comments on the combination possibilities of the pigmenting of the fibre-reinforced tubular casing according to the invention in cases where it is required to obtain a fairly wide range of colours by using different pearlescent pigments and additional dyes. This relatively wide range of colours is useful in particularly by virtue of the above-mentioned possibility of also obtaining a form of "division" of the impregnation in accordance with the invention insofar as the reinforcing substrate is externally and internally impregnated in separate operations.

In order to adjust the required metallic effect, it is possible for example to add only one metallic pigment or even two or more metallic pigments to the external impregnation viscose. Similarly, it is of course possible to add to the viscose used for the internal impregnation not only one additional dye as toning dye, but also two or even more additional dyes as toning dyes. Since in addition it is equally possible to add both to the internal viscose and also to the external viscose a pigment composition of different metallic pigments and in addition different additional dyes as toning dyes, the range of colours which is available to the expert in accordance with the invention is so extensive that only a few of the possible combinations are shown in the following Table:

| No. | Dye No. 1 | Dye No. 2 | Metallic pearlescent pigment No. 1 | Metallic pearlescent pigment No. 2 |
|---|---|---|---|---|
| 1 | − | − | − | − |
| 2 | − | − | + | − |
| 3 | + | − | + | − |
| 4 | − | + | + | − |
| 5 | + | + | + | − |
| 6 | − | − | − | + |
| 7 | + | − | − | + |
| 8 | − | + | − | + |
| 9 | + | + | − | + |
| 10 | − | − | + | + |
| 11 | + | − | + | + |
| 12 | − | + | + | + |
| 13 | + | + | + | + |

The above list applies equally to the hardened external impregnation viscose and also to the hardened internal impregnation viscose. Each of the above-mentioned possibilities for the internal impregnation viscose may be combined with each of the above-mentioned possibilities for the external impregnation viscose, providing the external impregnation viscose contains at least one pearlescent flake pigment.

By comparison with the non-pigmented tubular casings known from DT-AS No. 1,302,384, the tubular casings according to the invention pigmented with metallic pearlescent flake pigments have a 25% lower permeability to water vapour and hence a correspondingly lower shrinkage because the pigment particles do not of course shrink with the casing although on the other hand they do not interfere with the shrinkage of the precipitated cellulose surrounding them. Accordingly, the reduction in shrinkage actually derives from the percentage of hardened viscose replaced by metallic pearlescent pigment particles. The use tests described above show that the residual shrinkage of approximately 75% is entirely sufficient for keeping the sausage tight and firm in the casing.

In addition, this somewhat reduced shrinkage is even of advantage because it frequently avoids an undesirably high pressure of the shrunk casing on the sausage filling which is necessary because the escape of jelly-like pieces of sausage through the "flower" at the gathered tied ends of the filled casings, so often troublesome in the past, is avoided in this way. Another advantage of the somewhat reduced shrinkage is the considerable reduction in the undesirable oozing out of sausage at the point where the casing is cut which frequently takes place in the event of relatively high shrinkage.

The seamless coating on the inside of the casing which prevents permeability to water vapour and hence moisture-induced shrinkage and, in addition, the permeation of gases is to be seen in connection with the above-mentioned shrinkage of the tubular casing according to the invention in dependence upon permeability to water vapour. According to the invention, the coating may consist not only of the above-mentioned vinylidene halide copolymers, but also of polyolefins or nitrocellulose or of any other suitable macromolecular substance. Providing the pearlescent appearance of the tubular casing according to the invention is not impaired in any way, the inner coating preventing permeability to water vapour may even be omitted in special cases.

What we claim is:

1. A process for the production of metallic lusterous fiber reinforced tubular casing being able to shrink in dependence on the moisture level of the atmosphere comprising the steps:
   (a) mixing and homogenizing pearlescent flake pigment with an alkaline solution of commercial-grade cellulose-xanthogenate;
   (b) contacting and impregnating a long-fiber paper reinforced substrate with the homogenized mixture from (a) without previously applying a gel-like sealing coating;

(c) hardening the impregnated mixture in and on said substrate; and optionally (d) coating the impregnated tubular casing thus obtained with a seamless coating of a vinylidene halide copolymer lacquer on the inside of the tubular casing.

2. A process according to claim 1 wherein the pearlescent flake pigment of step (a) has been previously dispersed in an alkaline reacting dispersant.

3. A process according to claim 1 wherein said pigment amounts to 5 to 60% by weight of the homogenized dispersion of step (b).

4. A process according to claim 1 wherein the pigment comprises primarily titanium dioxide-mica silver pearlescent flake pigment.

5. A process according to claim 1 wherein the pigment comprises primarily titanium dioxide-mica gold pearlescent flake pigment.

6. A process according to claim 1 wherein the pigment comprises primarily titanium dioxide-mica copper pearlescent flake pigment.

7. A process according to claim 1 wherein the alkaline reacting dispersant is ripened viscose or aqueous solution of an alkalihydroxide.

8. A fiber-reinforced metallic lusterous pigmented tubular casing being able to shrink in dependence on the moisture level of the atmosphere produced by the process as claimed in claim 1.

* * * * *